(12) United States Patent
Yacoub (10) Patent No.: US 8,763,377 B2
(45) Date of Patent: Jul. 1, 2014

(54) METHOD FOR ADAPTING A LEAN NOX TRAP IN AN EXHAUST SYSTEM OF A MOTOR VEHICLE

(75) Inventor: Yasser Mohamed sayed Yacoub, Koln (DE)

(73) Assignee: Ford Global Technologies, LLC, Dearborn, MI (US)

( * ) Notice: Subject to any disclaimer, the term of this patent is extended or adjusted under 35 U.S.C. 154(b) by 179 days.

(21) Appl. No.: 13/269,349

(22) Filed: Oct. 7, 2011

(65) Prior Publication Data

US 2012/0090297 A1    Apr. 19, 2012

(30) Foreign Application Priority Data

Oct. 14, 2010    (DE) .......................... 10 2010 038 175

(51) Int. Cl.
  *F01N 3/10*    (2006.01)
(52) U.S. Cl.
  USPC ................. 60/299; 60/277; 60/294; 60/295
(58) Field of Classification Search
  USPC .................................................. 60/274–324
  See application file for complete search history.

(56) References Cited

U.S. PATENT DOCUMENTS

| 6,327,848 | B1 * | 12/2001 | Poggio et al. | 60/276 |
| 6,460,329 | B2 * | 10/2002 | Shimotani et al. | 60/285 |
| 6,889,497 | B2 * | 5/2005 | Schnaibel et al. | 60/285 |
| 7,150,144 | B2 * | 12/2006 | Nakagawa et al. | 60/277 |
| 7,628,009 | B2 * | 12/2009 | Hu et al. | 60/285 |
| 7,861,519 | B2 | 1/2011 | Fritsch | |
| 7,980,059 | B2 * | 7/2011 | Shibata et al. | 60/277 |
| 2004/0244361 | A1 * | 12/2004 | Tanabe et al. | 60/274 |
| 2009/0165440 | A1 * | 7/2009 | Sawada et al. | 60/276 |
| 2010/0024394 | A1 * | 2/2010 | Kitazawa | 60/276 |

FOREIGN PATENT DOCUMENTS

| DE | 4426020 A1 | 2/1996 |
| WO | WO 2007069780 A1 * | 6/2007 |
| WO | 2009016266 A2 | 2/2009 |

OTHER PUBLICATIONS

"Residual (numerical analysis)," <http://en.wikipedia.org/wiki/Residual_(numerical_analysis)>, Web page last modified Dec. 16, 2011.

Yacoub, Yasser Mohamed sayed, "Method for Adapting an Exothermic Reaction in the Exhaust System of a Motor Vehicle," U.S. Appl. No. 13/229,563, filed Sep. 9, 2011, 27 pages.

* cited by examiner

*Primary Examiner* — Jesse Bogue
(74) *Attorney, Agent, or Firm* — Julia Voutyras; Alleman Hall McCoy Russell & Tuttle LLP (57) ABSTRACT

A method for adapting a lean NOx trap (LNT) in an exhaust system of a motor vehicle is provided. The method comprises if a difference between an estimated NOx concentration and a measured NOx concentration in exhaust downstream of the LNT is greater than a threshold, calculating an adaptation value, the estimated NOx concentration downstream of the LNT based on a kinetic model, and adapting the kinetic model, adjusting one or more operating parameters of the LNT, and indicating an aging state of the LNT based on the adaptation value. In this way, the model may be updated in real time to produce a robust prediction of LNT function.

18 Claims, 6 Drawing Sheets

METHOD FOR ADAPTING A LEAN NOX TRAP IN AN EXHAUST SYSTEM OF A MOTOR VEHICLE

RELATED APPLICATIONS

The present application claims priority to German Patent Application No. 102010038175.6, filed on Oct. 14, 2010, the entire contents of which are hereby incorporated by reference for all purposes.

FIELD

The disclosure relates to a method for adapting a lean NOx trap in an exhaust system of a motor vehicle.

BACKGROUND AND SUMMARY

The exhaust system of a motor vehicle may comprise a catalytic converter with a lean NOx trap (LNT). The lean NOx trap has a multiplicity of ducts through which engine exhaust gases flow. During lean-burn operation of the engine, that is to say when a lambda value in the exhaust gas is greater than one, the lean NOx trap can collect nitrogen oxides (NOx) from the exhaust gas. Once the LNT has reached its storage capacity, it may begin to release NOx to the atmosphere. To prevent this, the LNT may be regenerated by converting the stored NOx via injection of a reactant, such as unburnt fuel, into the LNT.

The amount of nitrogen oxides stored in a lean NOx trap may be determined by a model of the lean NOx trap which takes into consideration the storage, the release and the conversion of the nitrogen oxides and the mass throughput of the nitrogen oxides upstream of the lean NOx trap. The rate of the NOx storage during lean-burn operation is dependent substantially on the spatial velocity, the temperature of the lean NOx trap and the normalized NOx storage level. The maximum storage capacity is dependent substantially on the size and design of the lean NOx trap and on the temperature of the catalytic converter. Said maximum storage capacity is then corrected for a deterioration in performance as a function of the thermal exposure over the lifetime of the lean NOx trap, also referred to as aging, and for the amount of stored sulfur, also referred to as poisoning.

However, the use of such models may be limited, as gradual changes to the storage capacity of the NOx trap may not be accounted for. Thus, the model may not be adapted in real time, leading to inaccuracies in the model.

The inventor has recognized the above issues and has provided a method herein to at least partly address the issues. A method for adapting a lean NOx trap (LNT) in an exhaust system of a motor vehicle is provided. The method comprises if a difference between an estimated NOx concentration and a measured NOx concentration in exhaust downstream of the LNT is greater than a threshold, calculating an adaptation value, the estimated NOx concentration downstream of the LNT based on a kinetic model, and adapting the kinetic model, adjusting one or more operating parameters of the LNT, and indicating an aging state of the LNT based on the adaptation value.

The disclosure provides an algorithm which is based on the NOx concentration downstream of the lean NOx trap and which provides a cascaded adaptation of the model. Said method permits real-time control using the NOx concentration downstream of the lean NOx trap. As a result of the cascading, that is to say the repeated relaying and use of the residual of the adaptation value, the latter is in a sense utilized multi-dimensionally, which permits particularly robust adaptation of the reaction.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
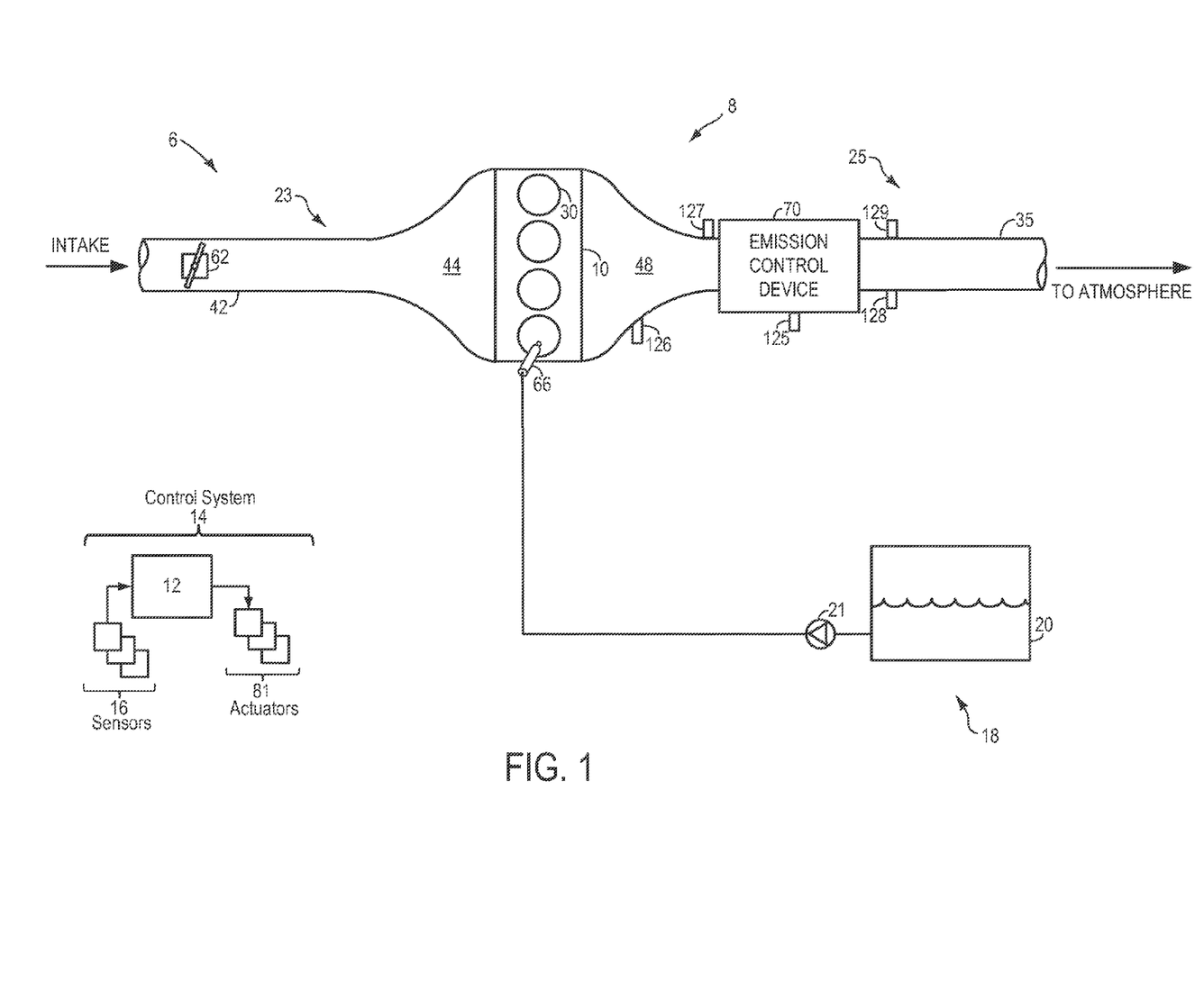
FIG. 1 shows a schematic diagram of a vehicle system.
Figure 2:
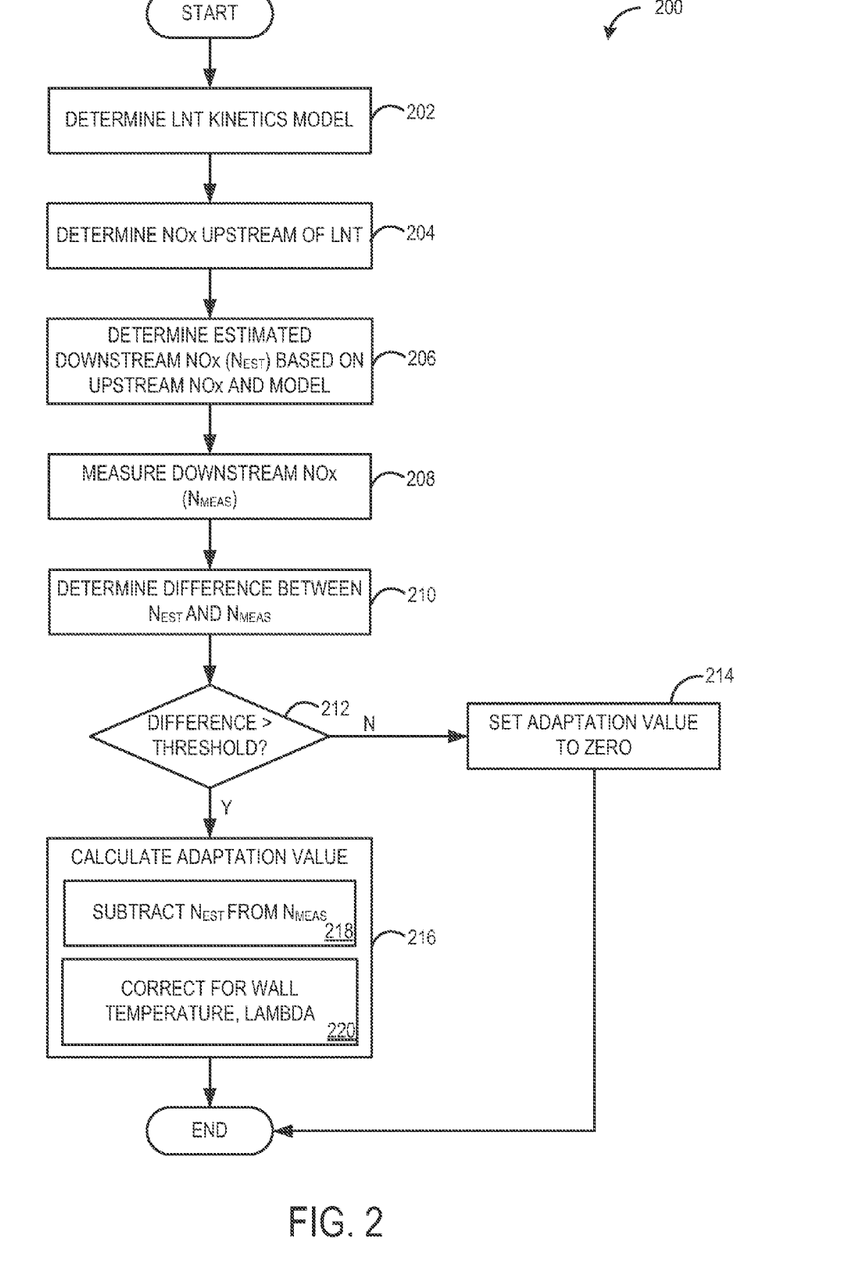
FIG. 2 shows a flow chart illustrating an example method for determining an adaptation value according to an embodiment of the present disclosure.
Figure 3:
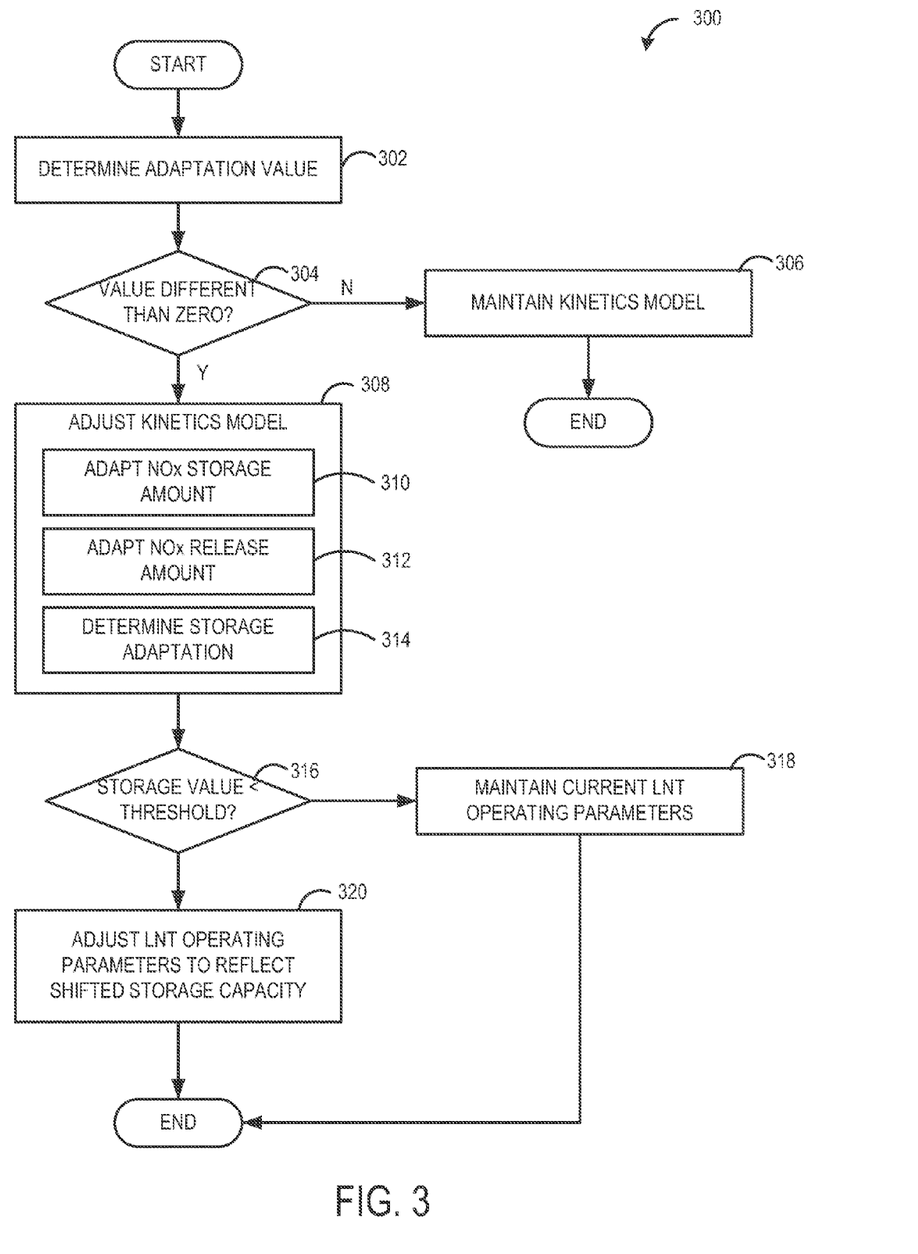
FIG. 3 shows a flow chart illustrating an example method for adapting a kinetic model according to an embodiment of the present disclosure.
Figure 4:
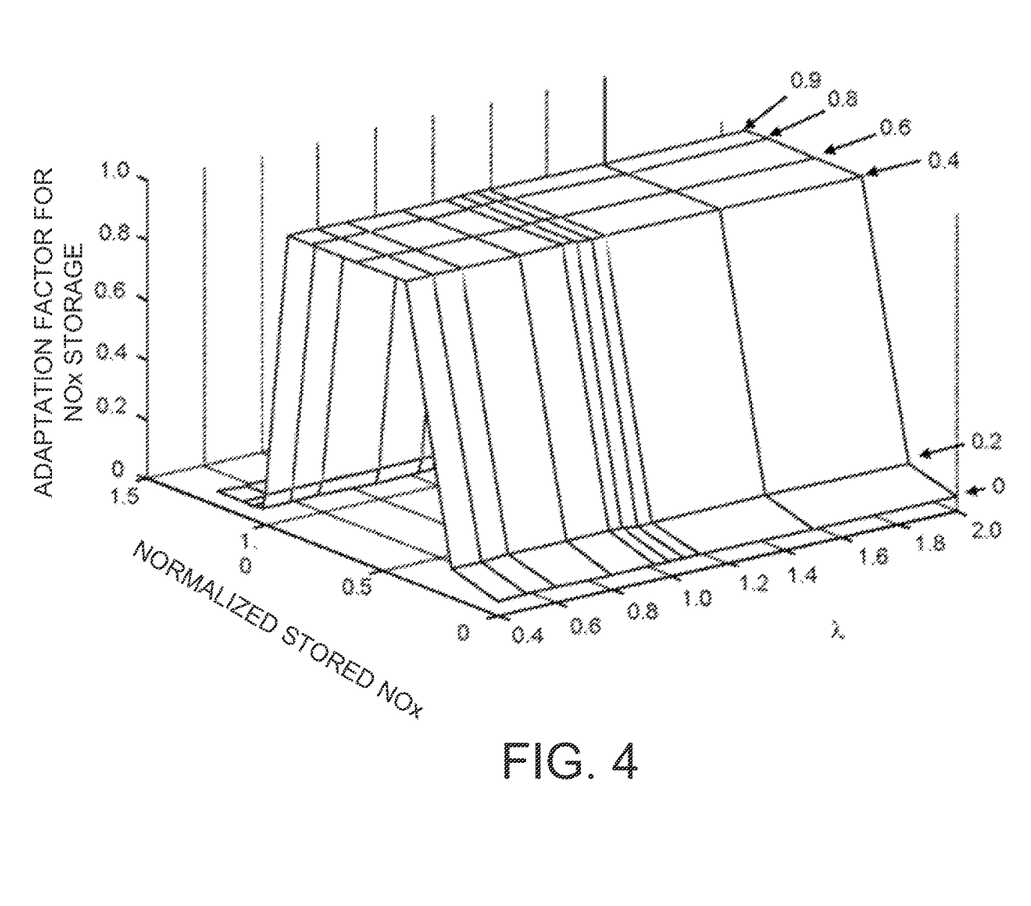
FIGS. 4-6 show example diagrams illustrating factors contributing to the kinetic model.
Figure 5:
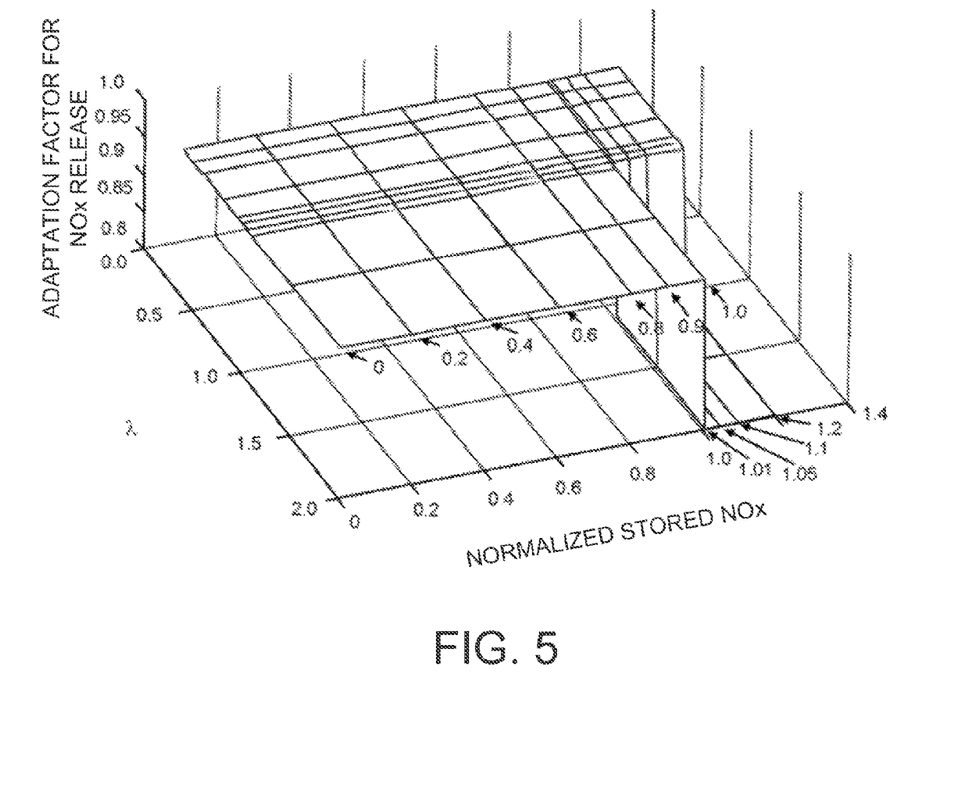
Figure 6:
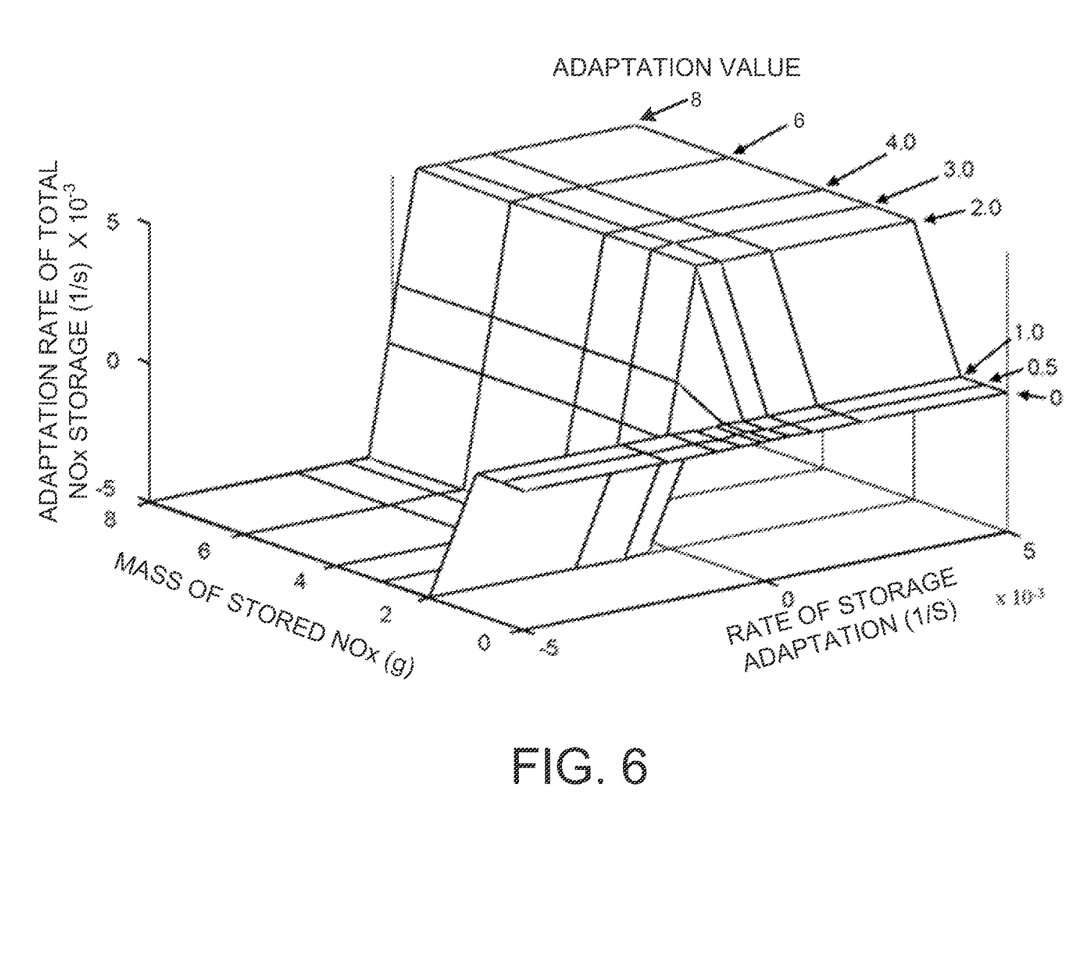

A kinetic model may be used to predict functioning of a lean NOx trap (LNT) in an exhaust stream of a vehicle. When an error in the prediction of the LNT function based on the model is detected, including when the prediction differs from one or more measureable parameters, such as the NOx concentration downstream of the LNT, an adaptation value may be calculated and used to adapt the kinetic model to predict LNT functioning. The contribution of various factors to the detected error, such as the amount of stored NOx in the LNT, may be determined, and the kinetic model may be adapted based on these factors. Further, one or more parameters of the LNT may be adjusted to ensure adequate catalyst function and proper emission reduction. FIG. 1 shows a vehicle system including an emissions control device. FIGS. 2-3 are example control routines for determining the adaptation value and adapting the kinetic model. FIGS. 4-6 illustrate various factors of the kinetic model FIG. 1 shows a schematic depiction of a vehicle system 6. The vehicle system 6 includes an engine system 8, a control system 14, and a fuel system 18. The engine system 8 may include an engine 10 having a plurality of cylinders 30. The engine 10 includes an engine intake 23 and an engine exhaust 25. The engine intake 23 includes a throttle 62 fluidly coupled to the engine intake manifold 44 via an intake passage 42. The engine exhaust 25 includes an exhaust manifold 48 leading to an exhaust passage 35 that routes exhaust gas to the atmosphere. The engine exhaust 25 may include one or more emission control devices 70, which may be mounted in a close-coupled position in the exhaust. One or more emission control devices may include a three-way catalyst, selective catalytic reduction (SCR) system, lean NOx trap (LNT), diesel particulate filter, oxidation catalyst, etc. Emission control device 70 may utilize reductants in the exhaust stream, such as urea or unburnt fuel, to reduce substrates such as NOx and CO in the exhaust. As such, emission control device 70 may include a reductant injector. In other embodiments, reductants may be introduced via a fuel injection system in the engine. It will be appreciated that other components may be included in the engine such as a variety of valves and sensors.

Fuel system 18 may include a fuel tank 20 coupled to a fuel pump system 21. The fuel pump system 21 may include one or more pumps for pressurizing fuel delivered to the injectors of engine 10, such as the example injector 66 shown. While only a single injector 66 is shown, additional injectors are provided for each cylinder. It can be appreciated that fuel system 18 may be a return-less fuel system, a return fuel system, or various other types of fuel system.

The fuel tank 20 may hold a plurality of fuel blends, including fuel with a range of alcohol concentrations, such as various gasoline-ethanol blends, including E10, E85, gasoline, etc., and combinations thereof.

The vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include catalyst temperature sensor 125, exhaust gas sensor 126 and NOx sensor 127 located upstream of the emission control device, and exhaust gas sensor 128 and NOx sensor 129 located downstream of the emission control device. Other sensors such as pressure, temperature, air/fuel ratio, and composition sensors may be coupled to various locations in the vehicle system 6. For example, temperature sensors (not shown) may be positioned upstream and downstream of the emissions control device. As another example, the actuators may include fuel injector 66 and throttle 62. For example, the control system may receive a signal from one or more oxygen sensors in the exhaust, indicating an air-fuel ratio of the exhaust, and may be configured to adjust the amount of fuel injected to achieve a desired air-fuel ratio. In some embodiments, the amount of fuel injected may be adjusted based on feedback from an LNT kinetic model, explained below, to enable optimal LNT function.

The control system 14 may include a controller 12 comprising a computer readable storage medium comprising instructions that may be executed to carry out one more control routines. The controller may receive input data from the various sensors, process the input data, and trigger the actuators in response to the processed input data based on instruction or code programmed therein corresponding to one or more routines. Example control routines are described herein with regard to FIGS. 2-3.

FIG. 2 shows a flow diagram of a method 200 for determining an adaptation value for a kinetic model of a lean NOx trap, such as emission control device 70. Method 200 may be carried out by a control system of a vehicle, such as control system 14. Method 200 comprises, at 202, determining an LNT kinetic model. The kinetic model may utilize various measureable inputs to predict LNT function, in one example the model may use a downstream NOx concentration. NOx concentration in the downstream exhaust may be indicative of the NOx storage and release occurring in the LNT. The kinetic model may be based on any suitable parameters, including the mass flow of exhaust through the LNT, the age of the LNT, the energy balance in the LNT including heat losses and heat transfer, the amount of reductant in the exhaust, the storage capacity of the LNT, the air-fuel ratio of the exhaust, etc. By us of the kinetic model, firstly the amount of nitrogen oxides stored in the lean NOx trap may be calculated. Secondly, in the kinetic model, an estimated NOx concentration downstream of the lean NOx trap may be estimated, as described below.

At 204, method 200 comprises measuring the NOx concentration upstream of the LNT. The upstream NOx concentration may be determined based on a sensor upstream of the catalyst, such as sensor 127, or it may be estimated based on exhaust temperature, mass flow, etc. The upstream NOx concentration may then be used as an input in the kinetic model at 206 to determine an estimated NOx concentration, $N_{EST}$, downstream of the LNT. The estimated downstream NOx concentration may be subjected to a time delay and/or filtered with a low-pass filter. The time delay may take into consideration the propagation time to the position of the sensor downstream, while the low-pass filtering takes into consideration the time constant of the sensor model.

At 208, the actual measured NOx concentration downstream of the catalyst, $N_{MEAS}$, is determined by a sensor, such as sensor 129. At 210, the measured NOx concentration is compared to the estimated NOx concentration, and a difference between the two is determined. The difference is compared to threshold at 212. If the difference is not greater than a threshold, method 200 proceeds to 214 to set an adaptation value to zero. If the difference is the less than the threshold, it indicates that the estimated NOx concentration is within an acceptable margin of error, and thus the kinetic model is not adapted. The threshold may be any suitable threshold. For example, a limit function may be calculated on the basis of the measured NOx concentration downstream and a mass throughput of nitrogen oxides in the exhaust gas. The limit function may have a minimum limit and a maximum limit which determine the threshold.

If the difference between the estimated and measured NOx concentration is greater than the threshold, method 200 proceeds to 216 to calculate an adaptation value. The adaptation value is calculated by subtracting $N_{EST}$ from $N_{MEAS}$ at 218. In some embodiments, the difference between the estimated NOx concentration and the respective closest threshold limit may be used instead of the measured NOx concentration. At 220, the difference between $N_{EST}$ and $N_{MEAS}$ is corrected for substrate wall temperature and the air fuel ratio, or lambda, of the exhaust. The air-fuel ratio (AFR) may be determined either upstream or downstream of the catalyst, or may be determined at both locations. The air-fuel ratio may be determined by one or more oxygen sensors in the exhaust, such as sensors 126 and 129. The temperature of the catalyst substrate wall may be estimated based on the measured downstream temperature, mass flow through the catalyst, storage capacity of the catalyst, etc., or may be directly determined by a temperature sensor in the catalyst.

The dependence of the wall temperature and on lambda is used to adapt the intensity of the adaptation to preferred kinetics of the NOx aftertreatment. Here, it may be taken into consideration that, for a low temperature and lean-burn operation, storage effects are of primary importance, or in the case of a high temperature and lean-burn operation, primarily thermal desorption is of significance, or in the case of a medium temperature range and rich operation, NOx release and conversion are of primary importance. Thus, the difference between $N_{EST}$ and $N_{MEAS}$ may be corrected for substrate temperature and lambda, and the result is the adaptation value, which may be used to update the kinetic model, as explained below. After determining the adaptation value, method 200 ends.

Thus, method 200 provides for determining an adaptation value based on a difference between an estimated and measured NOx concentration in exhaust downstream of the LNT. When the estimated concentration is different from the measured concentration by a large enough amount, it indicates an error in the kinetic model. Additionally, it may indicate that the LNT is not functioning as predicted. Accordingly, the kinetic model may be adapted to reduce the error and predict LNT functioning. Further, one or more operating parameters of the LNT may be adjusted to ensure adequate reduction of exhaust constituents.

FIG. 3 depicts a method 300 for adapting a kinetic model of an LNT, based on a determined adaptation value. Method 300 may be carried out by a control system of a vehicle. Method 300 comprises, at 302, determining an adaptation value. The adaptation value may be determined based on the measured and estimated NOx concentration downstream of the LNT, as described with respect to FIG. 2. At 304, it is determined if the adaptation value is different than zero. As explained above with respect to FIG. 2, when the difference between the estimated and measured concentrations is not greater than a threshold amount, the adaptation value is set to zero. Thus, if it is determined at 304 that the adaptation value is not different than zero, method 300 proceeds to 306 to maintain the kinetic model without adjustments, as the model is adequately accurate in predicting the downstream NOx concentration. If the adaptation value is different than zero, method 300 proceeds to 308 to adjust the kinetic model.

The kinetic model may inaccurately predict the NOx concentration downstream of the catalyst. Two factors may contribute to the inaccuracies of the model, NOx storage and NOx release. Thus, adapting the model may include adjusting the NOx storage and release factors of the model.

At 310, the amount of stored nitrogen oxides is adapted by the adaptation value. A contribution which directly corrects the mass of stored nitrogen oxides is shown in FIG. 4, where the scaled adaptation value for stored NOx is shown as a function of the normalized stored NOx and air/fuel ratio. This is the dominant factor for normalized stored nitrogen oxides between 0.2 and 0.9. The adaptation value is corrected for a suitable sign, such that for lean-burn operation (lambda greater than one), a positive sign is used. This indicates that, for a measured NOx limit which is higher than the estimated NOx concentration downstream, the adaptation includes increasing the stored amount of NOx. In contrast, for rich operation with lambda less than one, a negative sign is used, which indicates that, for a measured NOx limit which is higher than the estimated NOx concentration downstream, the adaptation includes reducing the stored amount of NOx, which corresponds to an increase in the NOx release in the exhaust-gas flow. The signs may also be used in the reversed sense.

At 312, the NOx release is adapted by the remaining adaptation value not used to adjust the storage factor above. The remaining NOx adaptation value is calculated as a subtraction of one minus the adaptation factor or contribution for the NOx storage. The remaining NOx adaptation value is then multiplied by an adaptation factor for the NOx release, which substantially directly corrects the NOx in the exhaust system. This is limited as a function of the estimated amount of nitrogen oxides upstream, on account of the uncertainty in the estimation or measurement. It is subsequently used for the calculation of the converted nitrogen oxides. As shown in FIG. 5, where the adaptation value for released NOx is plotted as a function of the normalized stored NOx and air/fuel ratio, said contribution is reduced if the normalized stored nitrogen oxides are greater than one and the value of lambda is greater than one.

At 314, a storage adaptation is determined. The NOx release calculated at 312 is subtracted from the NOx adaptation value and is converted from a concentration into a mass throughput. This is divided by the maximum LNT storage capacity, and a storage adaptation rate (1/s) is generated by a sign reversal.

The storage adaptation rate is then used together with the mass of stored nitrogen oxides to generate the adaptation of the total rate of the NOx storage, as shown in FIG. 6, which plots the total adaptation rate of stored NOx as a function of the adaptation value, the rate of storage adaptation, and the mass of stored NOx. Furthermore, a rate of the thermal stability of the lean NOx trap is detected and the storage adaptation rate is deactivated or set equal to zero for large temperature gradients. In the case of large temperature gradients such as may occur during start-up and shut-down processes, accurate modeling may not be possible under some circumstances. Said short time periods are therefore not taken into consideration in the modeling. As shown in FIG. 6, the total rate of the adaptation is active only for a minimum mass of stored nitrogen oxides and furthermore such that, for a measured NOx limit higher than the estimated NOx concentration downstream, the storage rate of the adaptation is negative, which is indicative of a deterioration of the total storage level.

Finally, said storage adaptation rate or adaptation rate of the total NOx storage is integrated, wherein initialization is carried out to a value of one. A factor is generated from this and said factor is multiplied by the nominal total storage capacity, as calculated for a new catalytic converter and modified for the thermal aging and the amount of stored sulfur, in order to generate a storage adaptation or an adaptation of the total NOx storage capacity. Said value is then used to improve the estimation of the mass of stored nitrogen oxides. For this purpose, the value is fed back to the kinetic model.

The NOx storage rate of the LNT may also be used to determine an aging state of the LNT. At 316, the NOx storage rate is compared to a threshold and determined if the storage rate is below the threshold. In this way, the storage adaptation may be used for a diagnosis of the exhaust system or of the NOx aftertreatment system if the value of the storage adaptation lies below a defined threshold, which is indicative of a used lean NOx trap which has come to the end of its expected service life. If the storage rate is above the threshold, method 300 proceeds to 318 to maintain current LNT operating parameters, as the LNT is not aged and thus has an adequate storage capacity.

If the storage rate is below the threshold, the LNT has a reduced storage capacity indicative of an aged LNT. Thus, method 300 proceeds to 320 to adjust LNT operating parameters to reflect the shifted storage capacity. For example, the frequency of regeneration events (periods of elevated catalyst temperature to burn off stored particles in the catalyst) may be increased, the amount of fuel injected to reach the light-off temperature may be increased, and the timing of reactant injected into the exhaust (such as unburnt hydrocarbons) may be adjusted. In other embodiments, rather than adjusting the operating parameters of the LNT, a replace LNT message may be indicated to a vehicle operator. Additionally, a message may be sent indicating to a vehicle operator to refill a reactant tank upstream of the LNT.

Thus, method 300 provides for determining a storage value of the LNT, and adjusting the kinetic model. This factor can be used to determine the relative age of the LNT, and if indicated, used to adjust operating parameters of the LNT to ensure optimal activity. If the factor is low enough, an indication to replace the LNT may be given. In this way, gradual decline in the storage capacity of the LNT may be determined and accounted for, enabling full activity over the period of LNT aging.

Thus, FIGS. 2 and 3 may provide for a method for a lean NOx trap (LNT). In one embodiment, the method includes determining a mass of stored NOx in the LNT, determining an error value based on a concentration of NOx downstream of the LNT, and adjusting the determined mass of stored NOx in the LNT based on the error value. The method may also include determining an amount of NOx released by the LNT based on the error value and/or determining an aging state of the LNT based on the error value.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for adapting a lean NOx trap (LNT) in an exhaust system of a motor vehicle, comprising: executing instructions on a control system comprising a computer readable storage medium, the instructions including:
   if a difference between an estimated NOx concentration and a measured NOx concentration in exhaust downstream of the LNT is greater than a threshold, calculating an adaptation value, the estimated NOx concentration downstream of the LNT based on a kinetic model;
   adapting the kinetic model, adjusting one or more operating parameters of the LNT, and indicating an aging state of the LNT based on the adaptation value; and
   determining a storage adaptation rate of the LNT based on the adaptation value and exhaust mass flow, the storage adaptation rate utilized for a diagnosis of the LNT if a value of the storage adaptation rate is below a defined threshold and if LNT temperature is changing by less than a threshold temperature.

2. The method as claimed in claim 1, further comprising determining a concentration of NOx upstream of the LNT using an estimation model and/or a sensor arranged upstream.

3. The method as claimed in claim 1, wherein the estimated NOx concentration downstream is subjected to a time delay and/or is filtered using a low-pass filter.

4. The method as claimed in claim 1, further comprising, if the difference between the estimated NOx concentration and the measured NOx concentration is not greater than the threshold, setting the adaptation value to zero.

5. The method as claimed in claim 1, wherein the adaptation value is corrected with regard to a wall temperature and/or lambda value of the exhaust.

6. The method as claimed in claim 1, further comprising determining a rate of thermal stability of the LNT.

7. The method as claimed in claim 1, further comprising, if the value of the storage adaptation rate is below the threshold, adjusting one or more LNT operating parameters based on a shifted storage capacity of the LNT.

8. A vehicle system, comprising:
   an engine having an exhaust passage;
   a lean NOx trap (LNT) coupled to the exhaust passage; and
   a control system comprising a computer readable storage medium comprising instructions for:
      determining an estimated NOx concentration downstream of the LNT based on a kinetic model, the kinetic model based at least in part on an estimated NOx storage capacity of the LNT;
      comparing the estimated NOx concentration to a measured NOx concentration downstream of the LNT;
      if a difference between the estimated NOx concentration and the measured NOx concentration is greater than a threshold, calculating an adaptation value, the adaptation value corrected for LNT wall temperature and exhaust air-fuel ratio; and
      adapting the kinetic model and determining an aging state of the LNT based on the adaptation value.

9. The system of claim 8, wherein calculating the adaptation value further comprises calculating an adaptation value based on the difference between the estimated and measured downstream NOx concentration.

10. The system of claim 8, wherein the computer readable storage medium comprises further instructions for adjusting a fuel injection amount and/or timing based on the aging state.

11. The system of claim 8, wherein adapting the kinetic model comprises adjusting the estimated NOx storage capacity of the LNT.

12. The system of claim 11, wherein adjusting the estimated NOx storage capacity of the LNT comprises adjusting the estimated NOx storage capacity based on the aging state of the LNT and an amount of stored sulfur in the LNT.

13. The system of claim 12, wherein the computer readable storage medium comprises further instructions for determining the aging state of the LNT and the amount of stored sulfur in the LNT based on a storage adaptation rate and a mass of stored NOx of the LNT, the storage adaptation rate based on the adaptation value.

14. A method for a lean NOx trap (LNT), comprising: executing instructions on a control system comprising a computer readable storage medium, the instructions including:
   determining a mass of stored NOx in the LNT based on a kinetic model, the kinetic model comprising a mass flow of exhaust through the LNT, an age of the LNT, energy balance in the LNT including heat losses and heat transfer, an amount of reductant in the exhaust, a storage capacity of the LNT, and an air-fuel ratio of the exhaust;
   determining an error value based on a concentration of NOx downstream of the LNT;
   adapting the kinetic model based on the error value; and
   adjusting the determined mass of stored NOx in the LNT based on the adapted kinetic model.

15. The method of claim 14, wherein the error value is based on a difference between an estimated NOx concentration and a measured NOx concentration downstream of the LNT.

16. The method of claim 14, wherein the mass of stored NOx in the LNT is determined further based on a NOx concentration upstream of the LNT.

17. The method of claim 14, further comprising determining an amount of NOx released by the LNT based on the error value.

18. The method of claim 14, further comprising determining an aging state of the LNT based on the error value.

* * * * *